US 6,704,771 B1

(12) United States Patent
Gough

(10) Patent No.: US 6,704,771 B1
(45) Date of Patent: Mar. 9, 2004

(54) ELECTRONIC MESSAGE PAYLOAD FOR INTERFACING WITH TEXT CONTAINED IN THE MESSAGE

(75) Inventor: Michael L. Gough, Ben Lomond, CA (US)

(73) Assignee: Neostar, Inc., Ben Lomond, CA (US)

( * ) Notice: Subject to any disclaimer, the term of this patent is extended or adjusted under 35 U.S.C. 154(b) by 0 days.

(21) Appl. No.: 09/400,781

(22) Filed: Sep. 21, 1999

(51) Int. Cl.[7] .......................... G06F 15/16; G06F 17/60
(52) U.S. Cl. ...................... 709/206; 709/203; 709/207; 705/27
(58) Field of Search ................................. 709/206, 207, 709/203, 217, 229, 218, 249; 705/14, 26, 27

(56) References Cited

U.S. PATENT DOCUMENTS

| 5,297,143 A | 3/1994 | Fridrich et al. |
| 5,396,588 A | 3/1995 | Fressl |
| 5,428,784 A | 6/1995 | Cahill, Jr. |

(List continued on next page.)

FOREIGN PATENT DOCUMENTS

| EP | 0 340 039 B1 | 4/1989 |
| EP | 0 631 419 B1 | 3/1996 |
| EP | 0 816 0990 A2 | 6/1997 |
| JP | 7-325827 | 12/1996 |
| JP | 10-171 27 | 1/1998 |
| WO | WO 98/58321 | 12/1998 |
| WO | WO 98/58332 | 12/1998 |

OTHER PUBLICATIONS

World Wide Web e–mail service provider Hotmail (hereinafter "Hotmail") available through th eweb site http://www.msn.com provided by the Microsoft Corporation, Exhibit App. 1 through 3 3nclosed herewith is a print out of displays of another feature of Hotmail called Mail Handling.

Real Networks, Inc. (hereinafter "RealNetworks") a corporation with headquarters at 2601 Elliott Avenue, Suite 1000, Seattle, WA 98121, offers a line of products that include Real Player and Real Audio and the like. Versions of these products may be downloaded from the Internet at http://www.real.com.

Exhibit B is a print out of a page from Activegrams with the address: http://www.activegrams.com?cgi–bin/viewactivegrams.cgi?dadbday on Sep. 26, 1999.

Exhibit C, which is a print out of apage from Activegrams with the address: http://www.activegrams.com?cgi–bin/viewactivegrams?cgi?1411215ki on Sep. 21, 1999.

The Internet article, "Death to Spam, A Guide to Dealing with Unwanted E–Mail" (herein after Death to Spam) obtained from the World Wide Web Address http://www-.mindworkshop.com/alchemy/nospam.html on Sep. 21, 1999.

The Internet article, "What can you do about bad email?" (herein after "Bad Email") obtained from the World Wide Web address http://www.oitc.com/Disney/WhatToDo.html, on Sep. 21, 1999.

(List continued on next page.)

Primary Examiner—Frantz B. Jean
(74) Attorney, Agent, or Firm—Perkins Coie LLP

(57) ABSTRACT

The present invention includes a system, method, and article of manufacture for communicating via an application program included as a payload of an electronic message. At least one application program is initialized after an electronic message is selected by a user. After initialization, the application program is executed. The execution of the application program includes displaying text included with the electronic message, and running a code segment including as a parameter at least a portion of the text included with the electronic message.

20 Claims, 9 Drawing Sheets

U.S. PATENT DOCUMENTS

| | | | | |
|---|---|---|---|---|
| 5,513,126 | A | 4/1996 | Harkins et al. | |
| 5,634,005 | A | 5/1997 | Matsuo | |
| 5,659,729 | A | 8/1997 | Nielsen | |
| 5,694,616 | A | 12/1997 | Johnson et al. | |
| 5,724,521 | A | 3/1998 | Dedrick | |
| 5,740,252 | A | 4/1998 | Minor et al. | |
| 5,740,374 | A | 4/1998 | Raffali-Schreinemachers | |
| 5,774,170 | A | 6/1998 | Hite et al. | |
| 5,774,534 | A | 6/1998 | Mayer | |
| 5,781,901 | A | 7/1998 | Kuzma | |
| 5,790,789 | A | 8/1998 | Suarez | |
| 5,793,972 | A | 8/1998 | Shane | |
| 5,806,043 | A | 9/1998 | Toader | |
| 5,809,242 | A | 9/1998 | Shaw et al. | |
| 5,815,830 | A | 9/1998 | Anthony | |
| 5,818,447 | A * | 10/1998 | Wolf et al. | 345/335 |
| 5,826,023 | A | 10/1998 | Hall et al. | |
| 5,826,062 | A | 10/1998 | Fake, Jr. et al. | |
| 5,832,208 | A * | 11/1998 | Chen et al. | 713/201 |
| 5,832,502 | A | 11/1998 | Durham et al. | |
| 5,838,790 | A | 11/1998 | McAuliffe et al. | |
| 5,848,397 | A | 12/1998 | Marsh et al. | |
| 5,856,825 | A | 1/1999 | Yumoto et al. | |
| 5,859,636 | A * | 1/1999 | Pandit | 345/339 |
| 5,884,246 | A | 3/1999 | Boucher et al. | |
| 5,903,269 | A | 5/1999 | Poreh et al. | |
| 5,909,545 | A | 6/1999 | Frese, II et al. | |
| 5,918,014 | A | 6/1999 | Robinson | |
| 5,937,162 | A | 8/1999 | Funk et al. | |
| 5,937,392 | A | 8/1999 | Alberts | |
| 5,948,061 | A | 9/1999 | Merriman et al. | |
| 5,956,486 | A | 9/1999 | Hickman et al. | |
| 6,002,393 | A | 12/1999 | Hite et al. | |
| 6,014,502 | A | 1/2000 | Moraes | |
| 6,014,688 | A * | 1/2000 | Venkatraman et al. | 709/206 |
| 6,014,698 | A | 1/2000 | Griffiths | |
| 6,049,778 | A | 4/2000 | Walker et al. | |
| 6,055,510 | A | 4/2000 | Henrick et al. | |
| 6,067,570 | A | 5/2000 | Kreynin et al. | |
| 6,092,104 | A | 7/2000 | Kelly | |
| 6,138,149 | A | 10/2000 | Ohmura | |
| 6,144,987 | A | 11/2000 | Niemi | |
| 6,167,395 | A | 12/2000 | Beck et al. | |
| 6,167,434 | A | 12/2000 | Pang | |
| 6,199,103 | B1 | 3/2001 | Sakaguchi et al. | |
| 6,199,106 | B1 * | 3/2001 | Shaw et al. | 709/217 |
| 6,205,432 | B1 * | 3/2001 | Gabbard et al. | 705/14 |
| 6,212,554 | B1 | 4/2001 | Roskowski | |
| 6,219,054 | B1 | 4/2001 | Komoda et al. | |
| 6,233,317 | B1 | 5/2001 | Homan et al. | |
| 6,253,231 | B1 | 6/2001 | Fujii | |
| 6,275,849 | B1 | 8/2001 | Ludwig | |
| 6,327,612 | B1 | 12/2001 | Watanabe | |
| 6,332,156 | B1 | 12/2001 | Cho et al. | |
| 6,351,763 | B1 * | 2/2002 | Kawanaka | 709/206 |
| 6,400,810 | B1 | 6/2002 | Skladman et al. | |
| 6,405,244 | B1 | 6/2002 | Bando et al. | |
| 6,415,332 | B1 | 7/2002 | Tuel, Jr. | |
| 6,427,164 | B1 | 7/2002 | Reilly | |
| 6,438,583 | B1 | 8/2002 | McDowell et al. | |
| 6,449,635 | B1 | 9/2002 | Tilden, Jr. et al. | |

OTHER PUBLICATIONS

The Internet article, "The Anti–Spam HOWTO" obtained from the World Wide Web address http://www.zikzak.zikzak.net/~acb/features/anit–spam–howto.html on Sep. 21, 1999.

The Internet article, "no Junk E–Mail Database" (herein after "No Junk E–Mail") obtained from the World Wide Web address http://www.glr.com/nojunk.html on Sep. 21, 1999.

The copies of pages obtained on Sep. 21, 1999 from the website entitled "Do–Not–Spam.com" located at the World Wide Web address http://www.do–not–spam.com/.

Yourdon, Java, the Web and Software Development, IEEE 1996.

* cited by examiner

ELECTRONIC MESSAGE PAYLOAD FOR INTERFACING WITH TEXT CONTAINED IN THE MESSAGE

RELATED APPLICATIONS

The present application relates to applications entitled "System, Method and Article of Manufacture for Preventing the Proliferation of Unwanted Electronic Messages", application Ser. No. 09/401,028, filed Sep. 21, 1999; "Method and Article of Manufacture for a Sub-Browser Application Program Stored in an Electronic Message", application Ser. No. 09/400,708, filed Sep. 21, 1999; "Method and Article of Manufacture for Delaying Advertisement Execution in a Geometric Electronic Media Distribution Framework", application Ser. No. 09/400,711, filed Sep. 21, 1999; "Textual Hyperlink Capable of Inputting Text as a Parameter While Executing an Associated Link", application Ser. No. 09/400,712, filed Sep. 21, 1999; and "Method and Apparatus for the Production, Deliver, and Receipt of Enhanced E-Mail", application Ser. No. 09/401,026, filed Sep. 21, 1999, and is now U.S. Pat. No. 6,360,221 B1, issued Mar. 19, 2002, which were filed concurrently herewith and are incorporated herein in their entirety.

FIELD OF THE INVENTION

The present invention relates to e-Commerce and more particularly to attaching objects to electronic messages distributed over a network.

BACKGROUND OF THE INVENTION

Electronic mail, or "e-mail", has become a popular way for people to communicate using networks of various types such as the Internet. Using e-mail, a person can send messages and other information as attachments electronically to other e-mail users. Such attachments normally include pictures, sound recordings, formatted documents, etc. that are in digital form, and which are executable independent of the opening and reading of the message included with the e-mail.

When using e-mail to communicate, a user will typically create a message using an e-mail program running on a computer that is or can be connected by a network to other computers. The message will include the e-mail address of the intended recipient along with the message and/or attachment. When the user has finished entering the message, the user will "send" the message and/or attachment to the intended recipient. The recipient, also using an e-mail program running on a computer connected to the computer network, can then read the received message and/or attachment.

In the case where the e-mail includes a personalized message from a known person, a recipient is very likely to open and view the message and any attachments. If such attachment is of particular interest, the recipient tends to send such attachment to others who, in turn, do the same. As a result, the attachment may be propagated over the network in a geometric manner, thus incurring widespread exposure.

The recent explosion in the popularity of the Internet has provided tremendous potential for marketing goods and services. However, for most small to mid-sized companies, advertising their wares and services through a web-site on the Internet has not proven to be very effective. One of the difficulties with advertising on the Internet is directing consumers to visit a particular web-site. The overabundance of web-site locations has created an information overload for many consumers.

E-mail is one possible solution for advertisers. Despite its allure, however, promotional e-mail is still frowned upon, and at present its content is generally limited to unformatted text without graphics which is often not personalized. Accordingly, promotional e-mail is often disregarded, and in almost all cases, is not propagated by the recipients themselves.

There is thus a need to harness the phenomenon of geometric propagation of certain attachments and personalized messages in a manner to solve the foregoing problems.

SUMMARY OF THE INVENTION

The present invention includes a system, method, and article of manufacture for communicating via an application program included as a payload of an electronic message. At least one application program of the payload is initialized after an electronic message is selected by a user. After initialization, the application program is executed. The execution of the application program includes displaying text included with the electronic message, and running a code segment including as a parameter at least a portion of the text included with the electronic message. As an option, the code segment may be run automatically in response to the electronic message being selected and opened.

In one aspect of the present invention, the application program may be executed on a network browser. Further, the electronic message may be selected on an electronic mail browser. As an option, the code segment may replace a selected string of the text of the electronic message with a graphic which, in one embodiment, may include a trademark or the like. As an option, the selection of the graphic may initiate a link to a site on the network. Further, the code segment may link a string of the text of the electronic message with a site on the network.

As such, the personal text of the electronic message may induce the user to open the mail while the functionality may serve as an inducement to send the electronic message to another user. This in turn may be used to incur visits to a particular site on the network. In the alternative, it may serve to afford widespread exposure of advertisements or any other feature that supports e-Commerce.

These and other advantages of the present invention will become apparent to those skilled in the art upon a reading of the following descriptions of the invention and a study of the several figures of the drawing.

BRIEF DESCRIPTION OF THE DRAWINGS

The foregoing aspects are better understood from the following detailed description of one embodiment of the invention with reference to the drawings, in which.

DETAILED DESCRIPTION OF THE PREFERRED EMBODIMENTS

Figure 1:
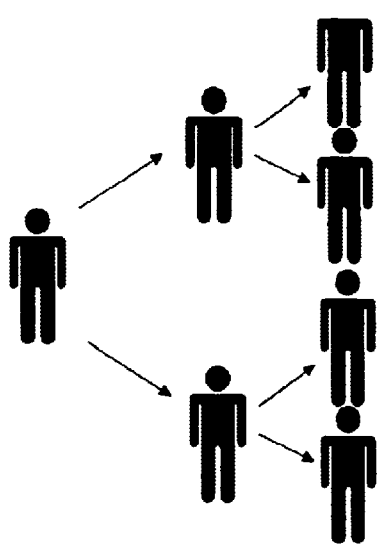
FIG. 1 is an illustration of the geometric manner in which an electronic message may be distributed over a network in accordance with the prior art.
Figure 2:
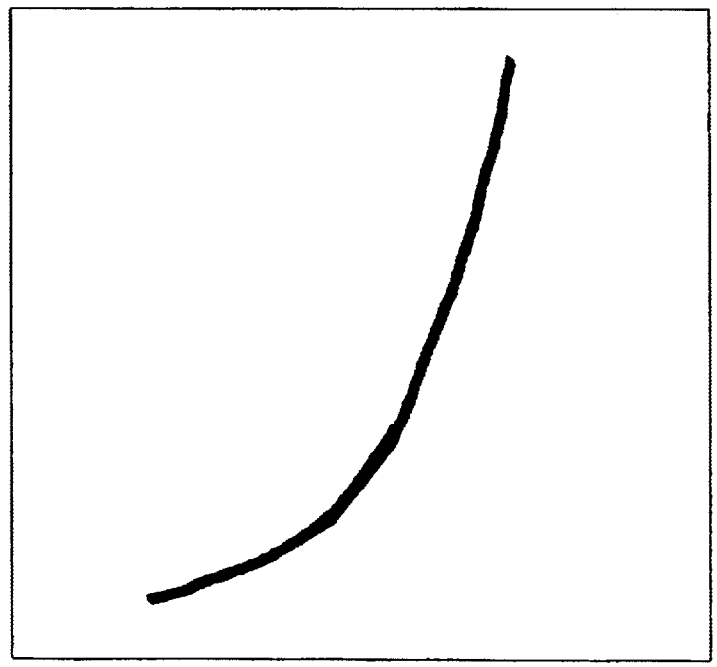
FIG. 2 is a graph depicting the geometric nature illustrated in FIG. 1.

FIGS. 1 and 2 illustrate the geometric manner in which an electronic message may be distributed over a network in accordance with the prior art. FIGS. 3–13 illustrate a system for providing an application program adapted to be incorporated as a "payload" of an electronic message. Such application program is automatically initialized after the electronic message is selected by a user. After initialization, the application program is executed. The execution of the application program includes various features.

For example, such execution may include displaying text included with the first electronic message, displaying indicia, allowing entry of text, and sending the entered text and the application program over a network in a second electronic message to a second user upon selection of the indicia. In one embodiment, a code segment may be executed which includes as a parameter at least a portion of the text included with the electronic message, thus incorporating the text with any type of functionality, i.e. graphic, etc. Still yet, other features may be included such as an advertisement that is displayed only after the electronic message is forwarded a predetermined number of instances. Also, the text included with the electronic message may constitute a hyperlink which, when selected, links to a site and enters the text as a parameter upon such linking.

As will become apparent, the personal text of the electronic message may induce the user to open the mail while the functionality may serve as an inducement to send the electronic message to another user. This in turn may be used to incur visits to a particular site on the network. In the alternative, it may serve to afford widespread exposure of advertisements or any other feature that supports e-Commerce.

Figure 3:
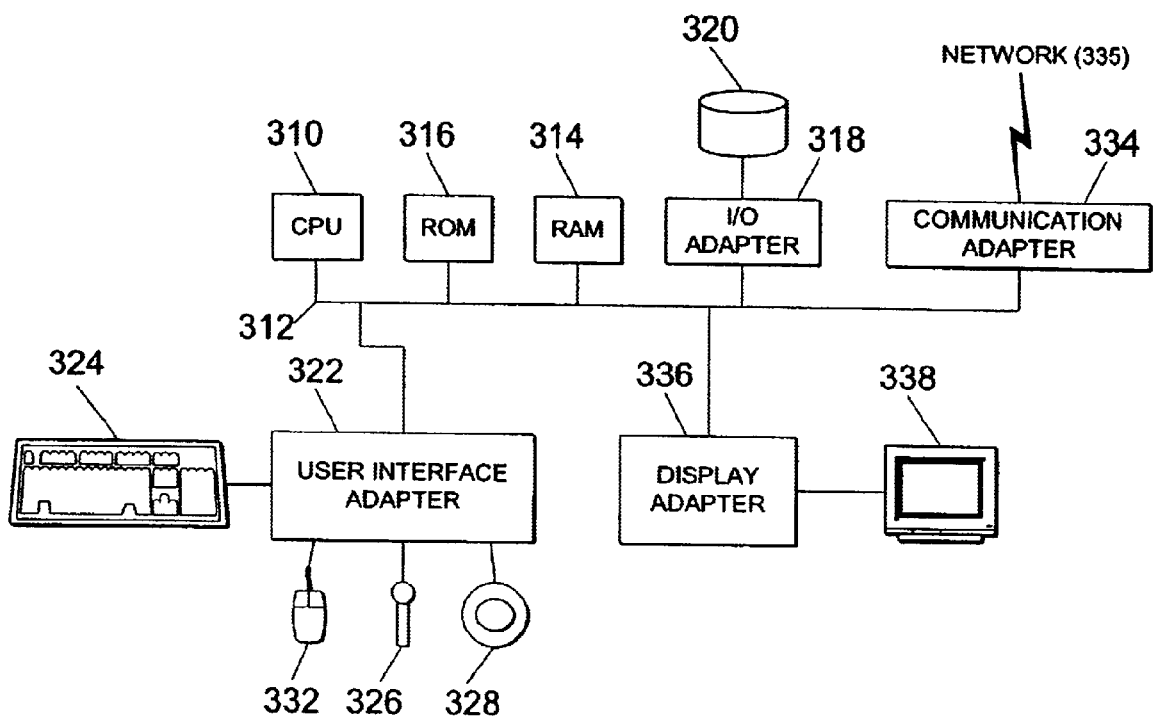
FIG. 3 is a schematic diagram of one exemplary hardware implementation of the present invention.

FIG. 3 illustrates an exemplary hardware configuration in accordance with one embodiment having a central processing unit 310, such as a microprocessor, and a number of other units interconnected via a system bus 312. The hardware configuration shown in FIG. 3 includes Random Access Memory (RAM) 314, Read Only Memory (ROM) 916, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the hardware configuration to a communication network 335 (e.g., a wide area network) and a display adapter 336 for connecting the bus 312 to a display device 338.

The hardware configuration typically has resident thereon an operating system such as the Microsoft Windows NT or Windows/98/2000 Operating System (OS), the IBM OS/2 operating system, the MAC OS, or UNIX operating system. Those skilled in the art will appreciate that the present invention may also be implemented on platforms and operating systems other than those mentioned.

Figure 4:
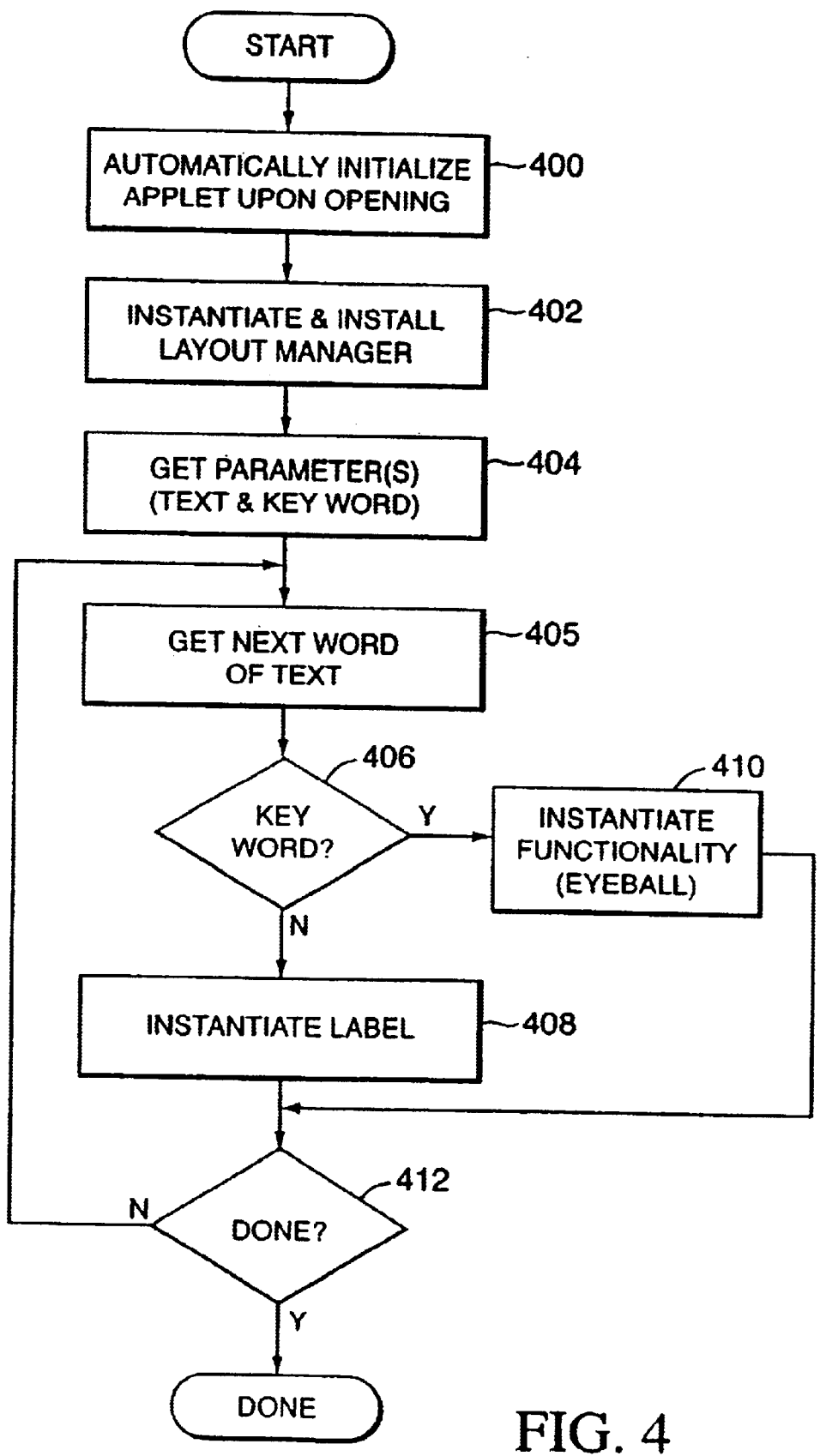
FIG. 4 is a flowchart illustrating the execution of the first application program of one embodiment of the present invention.

FIG. 4 is a flowchart illustrating the execution of the first application program associated with the first electronic message that is sent to a first user. The first electronic message may be received over any network such as a wide area network. In one embodiment, such wide area network may include the Internet and the first electronic message may be transmitted using a protocol such as TCP/IP and/or IPX. The first electronic message includes a first application program incorporated therein by any desired technique, along with a message, i.e. graphic, textual, audible, etc., generated by a previous user. In one embodiment, at least a portion of the first application program includes a JAVA APPLET. In the alternative, such first application program may include code segments written in any desired object-oriented computer programming or markup language.

As shown in operation 400 of FIG. 4, the first application program of the first electronic message is automatically initialized upon being selected, or "opened", by a user on an electronic mail browser, i.e. NETSCAPE COMMUNICATOR, MICROSOFT OUTLOOK, etc. Such selection may include "clicking" on an identifier of the first electronic message, or any other technique enabled by the electronic mail browser. Upon such user action, the first electronic message is initialized immediately in an automated manner. To accomplish this, the first application program may depart from an "attachment" in the traditional sense, and be included in the first electronic message itself. Further, the electronic mail browser must be capable of automatically recognizing and executing the computer or markup language employed by the application program, a common capability among electronic mail browsers.

Initialization of the first application program may include determining various variables and other parameters required to execute the application program, or any other "pre-execution" duties. For example, one of such parameters may comprise the body of text included with the first electronic message.

In one embodiment, hypertext markup language may be included with the first electronic message to contain the parameters and call another portion of the first application program such as a JAVA APPLET located at another site on the network. It should be noted, however, that the hypertext markup language itself or any other computer or markup language included with first electronic message may constitute a component or an entirety of the first application program. In other words, any desired portion(including no portion) of the first application program may be positioned at a separate location on the network.

Following is an example of hypertext markup language for containing the parameters and calling another portion of the first application program. In the present embodiment, a portion of the first application program is called using a URL on the network.

```
<HTML>
<HEAD>
<TITLE>Practice Applets</TITLE>
</HEAD>
<BODY>
<APPLET CODEBASE="http://www.esprinkles.com"
CODE="HelloAgainWorld.class" ARCHIVE="eyejar.jar" WIDTH=1000 HEIGHT=1000
ALIGN=left>
<PARAM NAME=info VALUE=" . . . body of text . . . ">
<PARAM NAME=keystring VALUE="I">
</APPLET>
</BODY>
</HTML>
```

In operation 402 of FIG. 4, execution of the first application program has commenced and a layout manager is instantiated and installed. Layout managers are well known to those of ordinary skill in the art, and function to define the graphical framework during execution. Specifics regarding the graphical framework will be set forth in greater detail in the description of FIG. 5.

Thereafter, in operation 404, a particular key string parameter is retrieved in addition to the entire body of text. The key string parameter may include a particular string of text that is included in the body of text. In one embodiment, the word "I" may be retrieved as the key string parameter. In still other embodiments, any other letter, expression, word, phrase, pattern, format, etc. may be used as a key string parameter.

Next, each word and/or phrase of the body of text is retrieved in operation 405, and compared with the key string parameter to determine whether there is a match in decision 406. To accomplish this, a parser such as ANTLR may be employed to identify the designated letter, expression, word, phrase, pattern, format, etc. If it is determined that a match does not exist, a convention label is instantiated for simply displaying the current word and/or phrase in operation 408. On the other hand, if it is determined that a match does indeed exist, a functionality is instantiated which incorporates the key string parameter in operation 410. It is then determined in decision 412 whether all of the words and/or phrases of the body of text have been compared. If not, the process operations 405–410 are repeated.

Figure 5:
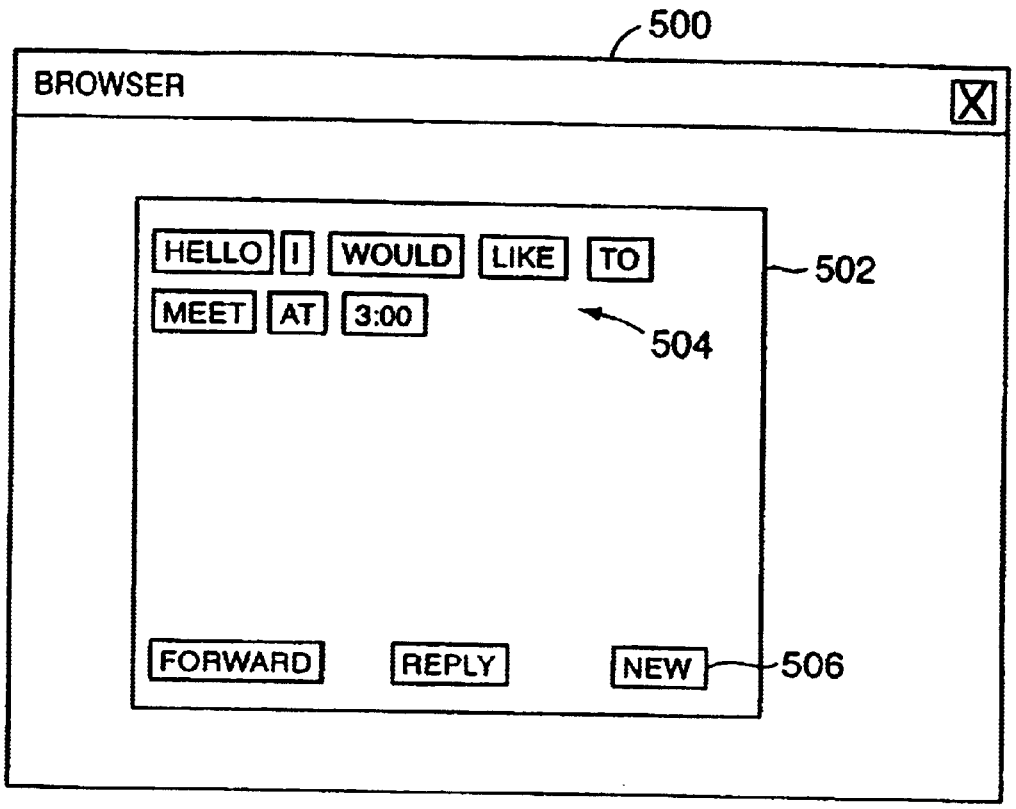
FIG. 5 is an illustration of a graphical user interface of the present invention that is displayed upon the execution of the first application program, and which is used to display the text of the first electronic message and any functionality associated therewith.

FIG. 5 is an illustration of a graphical user interface of the present invention that is displayed upon the execution of the first application program, and which is used to display the text of the first electronic message and any functionality associated therewith. As shown, a frame 500 of the network browser encompasses a text box 502. Such text box includes the body of text 504. Further, a plurality of first indicia 506 is displayed in or around the text box. In one embodiment, the first indicia may include a "FORWARD", "REPLY", and/or a "NEW" icon.

Figure 6:
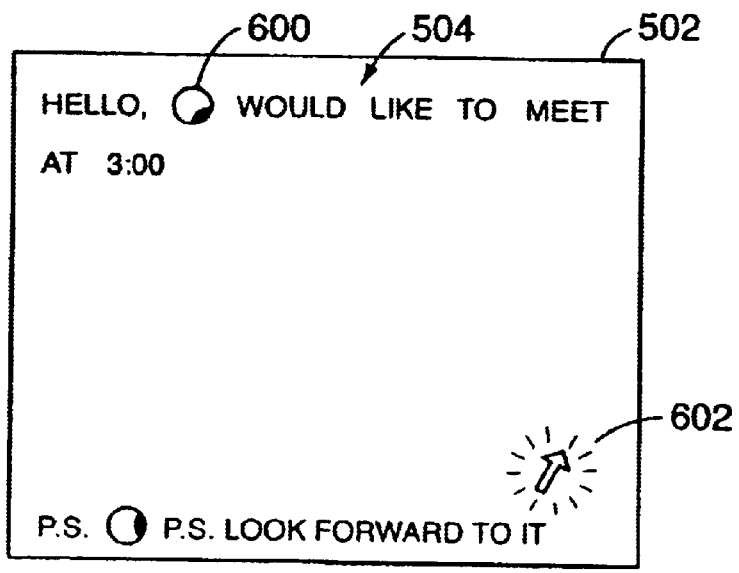
FIG. 6 illustrates one example of the functionality displayed upon execution of the first application program in accordance with one embodiment of the present invention.

FIG. 6 illustrates one example of the functionality displayed upon execution of the first application program. In such embodiment, the key string parameter is "I", and an eyeball 600 is graphically depicted in place of the key string parameter within the textbox 502. During use, the movement of the eyeball 600 may be adapted to coincide with the movement of a mouse cursor 602. This may be accomplished using a "mouse listener" which may interface with the first application program. Mouse listeners track a current position of mouse cursors. It should be noted that in various alternate embodiments, any type of user input may be used to change various aspects, i.e. graphic, textual, layout, color, sound, etc. of the first electronic message.

Programs that execute the foregoing eyeball graphic feature are commonly known to those of ordinary skill. Such programs commonly use atan2 in order to compute the angle between the eyeball and the mouse cursor. An example of a code segment that executes the mouse listener feature, and that calls the eyeball graphic feature is as follows:

```
import java.applet.*;
import java.awt.*;
import java.lang.*;
import java.util.*;
import java.awt.event*;
import java.net.*;
public class HelloAgainWorld extends Applet
{
Image backBuffer;
Graphics backG;
String s = "null";
public void init()
{
//this.setLayout(null)
this.setLayout(new FlowLayout(FlowLayout.LEFT));
s= getParameter("info")
StringTokenizer parser = new StringTokenizer(s);
try
{
  while(parser.hasMoreTokens())
  {
    String a = parser.nextToken()
    if (a.equals("I"))
    Eyeball2 eye = new Eyeball2(this);
    eye.setSize(30, 30)
    add(eye);
    Clicker click = new Clicker(this);
    eye.addMouseListener(click);
  }
  else
  {
    Label helloLabel = new Label();
    helloLabel.setText(a);
    helloLabel.setForeground(new Color(170, 27, 140));
    add(helloLabel);
  }
  }
}
catch (NoSuchElementException e)
{
}
}
public void paint(Graphics g)
{
    maintain();
```

-continued

```
        super.paint(backG);
            g.drawImage(backBuffer, 0, 0, null);
    }
    public void update(Graphics g)
    {
            maintain();
            super.update(backG);
            g.drawImage(backBuffer, 0, 0, null);
    }
    void maintain()
    {
            // Maintain the back buffer and the graphics context that is
    directed towards the back buffer.
            {
                    int w = getBounds().width;
                    int h = getBounds().height;
                    // If there is no buffer or it is the wrong width, or it is
    the wrong height, then adjust the back buffer.
                    if ( backBuffer == null || backBuffer.getwidth(null) != w ||
    backBuffer.getHeight(null) != h )
                    {
                    // Adjust the back buffer.
                    backBuffer = createImage( w, h );
                    // If we have a backBuffer, then make a graphics context
    that is directed towards the back buffer.
                            if (backBuffer != null)
                            {
                                    // Dispose of any previous graphics context that may
    have pointed to a previous back buffer.
                                    if ( backG != null )
                                    {
                                    backG.dispose();
                                    }
                                    // Now create the graphics context that is directed
    to the back buffer.
                                    backG = backBuffer.getGraphics();
                            }
                    }
            }
    }
}
class Clicker implements MouseListener
{
 Applet a;
 URL url;
  Clicker(Applet _a)
  {
  a = _a;
  }
  public void mouseClicked(MouseEvent evt)
  {
  }
  public void mousePressed(MouseEvent evt)
  {
  }
  public void mouseReleased(MouseEvent evt)
  {
  AppletContext ac = a.getAppletContext();
  try
  {
  url = new URL("http://207.82.252.253/cgi
bin/linkrd? lang=&hm action=http%3a%2f%2fwww%2eneostar%2ecom");
  }
  catch (MalformedURLException e)
  {
  System.out.println("I was a malformed url");
  }
  ac.showDocument(url);
}
public void mouseEntered(MouseEvent evt)
{
}
public void mouseExited(MouseEvent evt)
  {
  }
}
```

It should be noted that any type of functionality may be incorporated during the execution of the first application program. For example, advertisements may be displayed, etc.

Figure 7:
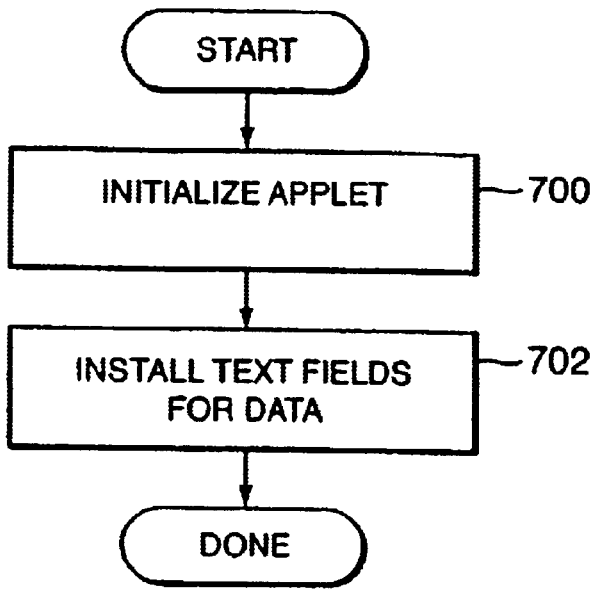
FIG. 7 illustrates the execution of the second application program of the present invention, or in an alternate embodiment, interaction with a site on the network which is initiated upon the selection of one of the "FORWARD", "REPLY", or "NEW" icons displayed in the graphical user interface of FIG. 5.

FIG. 7 illustrates the execution of the second application program of the present invention which is initiated upon the selection of one of the first indicia 506, i.e. the "FORWARD", "REPLY", and/or "NEW" icon, displayed in the graphical user interface of FIG. 5. It should be noted that, in a "server-based" embodiment, selection of one of the first indicia 506 may initiate a link to a site on the network, thus allowing interaction with the site to afford functionality similar to that afforded by the second application program. To accomplish this, each button may be generated using HTML and have a unique URL associated therewith. As an option, a user may simply access the site on the network to send an electronic message without having to first receive a message.

In particular, it will be assumed in the present description that the "NEW" icon has been selected. It should be noted, however, that given the present description it would be well within the ability of one of ordinary skill to implement the "FORWARD" and "REPLY" functions. With respect to the "REPLY" icon, there may be a need for a mechanism of transferring the body of text from the first application program to the second application program. This may be accomplished by a "cookie" or similar metadata-type information.

As shown in FIG. 7, a second application program is initialized upon the selection of the first indicia 506 in operation 700. It should be noted that, in one embodiment, the second application program may be a component of the first application program thus rendering a single application program. In one embodiment, the first application program includes an un-signed application program and the second application program includes a signed application program. Still yet, in the server-based embodiment, interaction with the site on the network is effected in lieu of the initialization of the second application program.

Similar to the first application program, initialization of the second application program may include determining various variables, and other parameters required to execute the application program. Next, in operation 702, text fields are installed for allowing entry of text by the first user.

Figure 8:
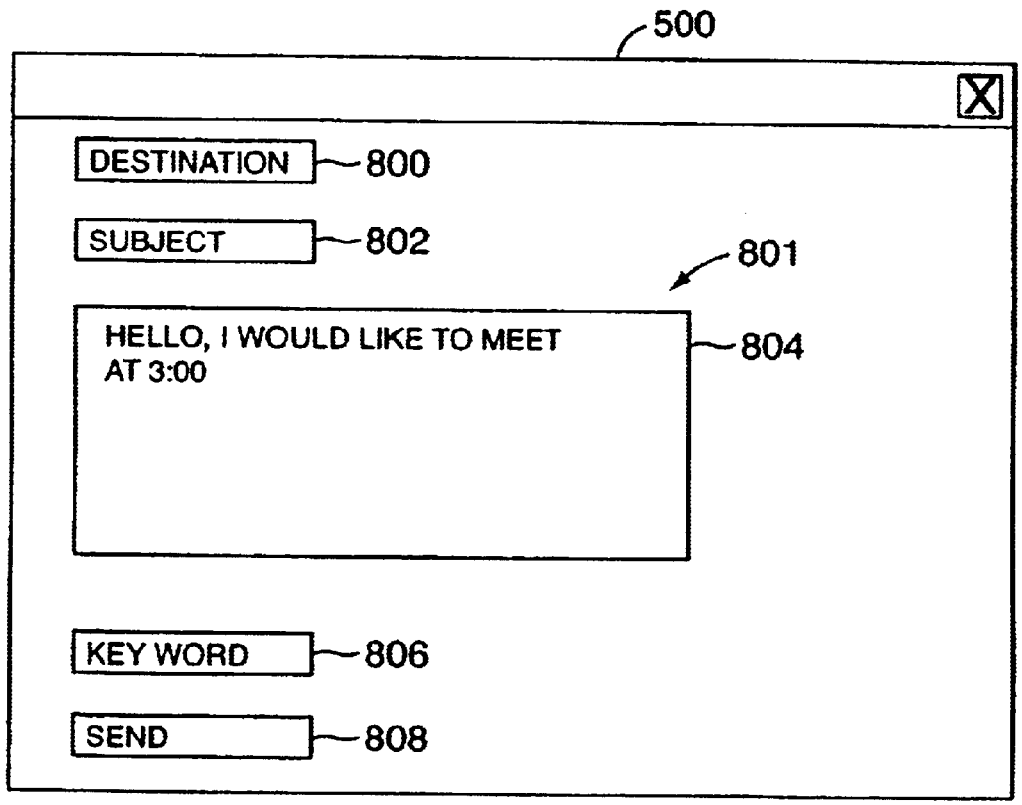
FIG. 8 is an illustration of a graphical user interface initiated after selection of one of the "FORWARD", "REPLY", or "NEW" icons in accordance with one embodiment of the present invention.

FIG. 8 is an illustration of a graphical user interface associated with the continued operation of the present invention after the selection of one of the first indicia 506 of FIG. 5. As shown, a plurality of text fields 801 are displayed within the frame 500 of the network browser. Included are a destination text box 800 for allowing the insertion of an electronic mail address of a desired destination, a subject text box 802 for allowing entry of a subject of a message, a body text box 804 for allowing entry of a body of text or message, and a key word text box 806 which is adapted for allowing entry of the key string parameter. Also included is second indicia 808 which may take the form of a "SEND" icon or the like.

Figures 9, 10:
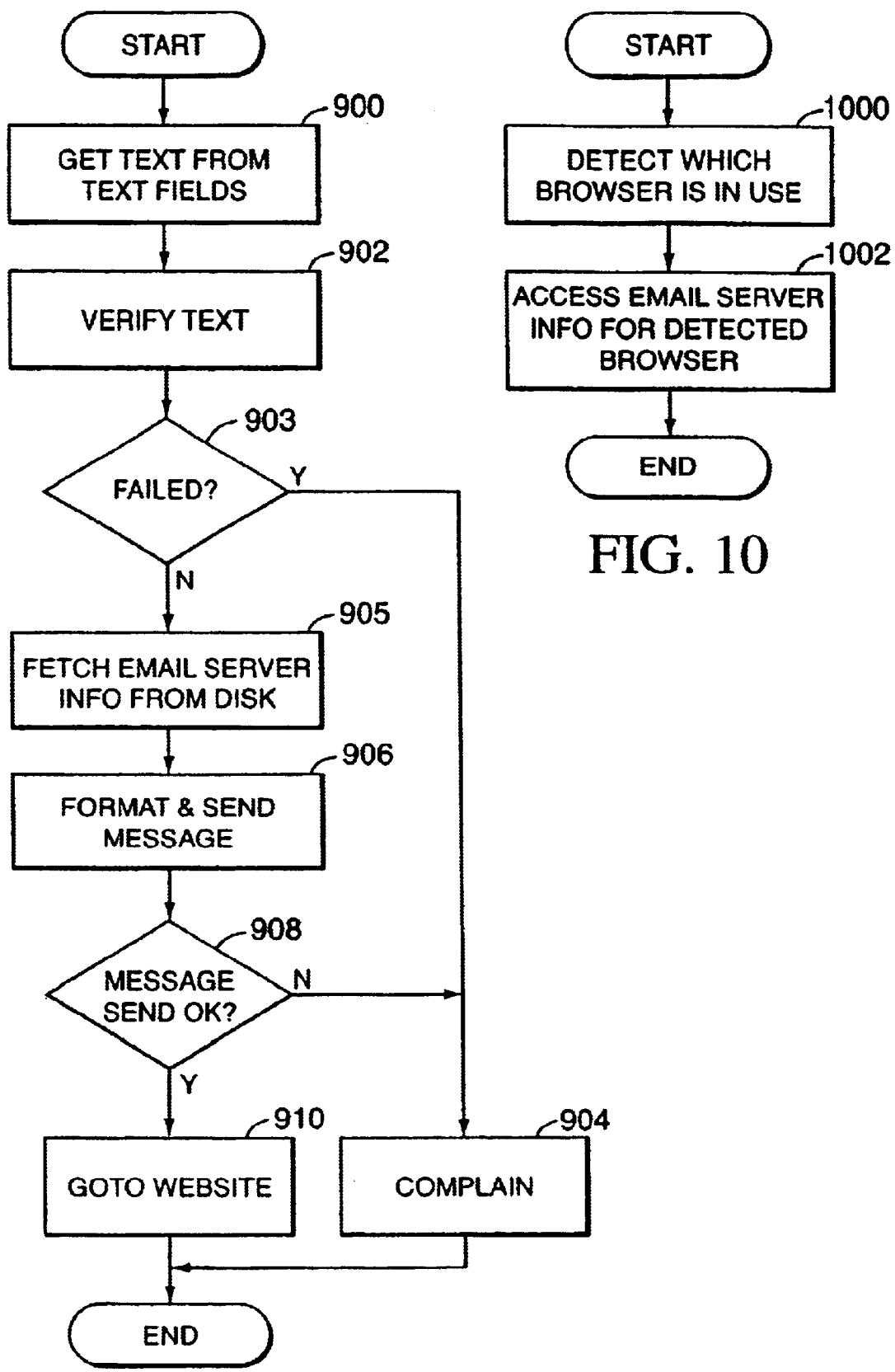
FIG. 9 is a flowchart illustrating the continued operation of the present invention upon the selection of the "SEND" or other similar icon on the graphical user interface of FIG. 8.
FIG. 10 is a flowchart illustrating the operations associated with the fetch e-mail operation of FIG. 9.

FIG. 9 is a flowchart illustrating the continued operation of the present invention upon the selection of the second indicia 808, i.e. "SEND", on the graphical user interface of FIG. 8. As shown, in operation 900, the text is first retrieved from the text fields 801 of the graphical user interface of FIG. 8. Next, in operation 902, the text is verified to ensure that each of the necessary text fields are filled and valid. For example, the text boxes 800 and 804 may be required.

If it is determined by decision 903 that the verification of operation 902 fails, a complaint is issued in operation 904.

Such complaint may take the form of a pop-up window or the like, and may describe the nature of any defects. On the other hand, if the verification of operation 902 succeeds and all of the necessary fields are filled, information associated with an electronic mail server of the first user is retrieved in operation 905. This may be accomplished by accessing a hard drive of a computer of the first user which is running the network browser and electronic mail browser. The purpose of obtaining this information is to identify a server from which the information in the text fields 801 may be sent in the form of a second message. In the alternative, a single designated server may be automatically identified by the second application program, thus obviating the need to access the hard drive of the computer of the first user.

Upon identifying a server from which the second message is to be sent, the second electronic message may be formatted and sent to a second user in operation 906. Upon being sent, another verification may be executed in decision 908 in order to ensure that the second electronic message was sent in a satisfactory manner. If successful transmittal of the message is not verified, a complaint may be issued in a manner similar to that discussed hereinabove with respect to operation 904.

If, on the other hand, successful transmittal of the message is verified in decision 908, the second application program may optionally link the first user to a site on the network in operation 910. Such site may be identified by the second application program. This feature may thus be used to increase a number of visits, or "hits", on a particular site which in itself may warrant substantial consideration.

FIG. 10 is a flowchart illustrating the operations associated with the fetch e-mail operation 905 of FIG. 9. As mentioned earlier, this may be accomplished by accessing a hard drive of a computer of the first user which is running the network browser and electronic mail browser. Before this may be effected, in operation 1000, the browser(s) that is currently in use may be detected after which the appropriate information may be accessed in operation 1002. As an option, permission to retrieve such information may be gained from the first user prior to any action being taken.

Figure 11:
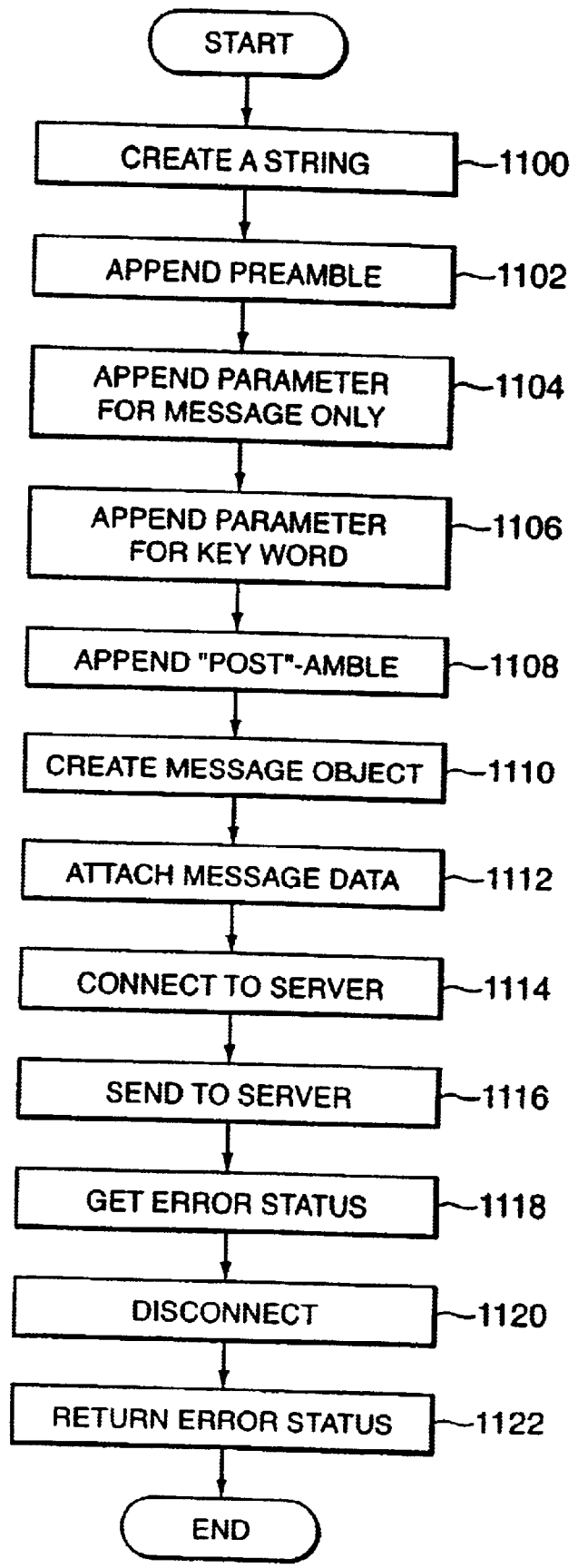
FIG. 11 is a flowchart illustrating the operations associated with the format and send message operation of FIG. 9.

FIG. 11 is a flowchart illustrating the operations associated with the format and send message operation 906 of FIG. 9. The format refers to the hypertext mark-up language of which an example was provided earlier. In order to generate such format, a string is first created in operation 1100. Thereafter, a preamble is appended to the string in operation 1102. Thereafter, the body of text and key string parameters are appended in operations 1104 and 1106 after which a postscript is appended in operation 1108. An example of each of the foregoing appended elements are outlined as follows using the example set forth earlier:

Preamble

```
<HTML>
<HEAD>
<TITLE>Practice Applets</TITLE>
</HEAD>
<BODY>
<APPLET CODEBASE="http://www.esprinkles.com" (*1st app. program*)
CODE="HelloAgainWorld.class" ARCHIVE="eyejar.jar" WIDTH=1000 HEIGHT=1000
ALIGN=left>
```

Parameter

```
<PARAM NAME=info VALUE=" . . . body of text . . . ">
```

Parameter

```
< PARAM NAME=keystring VALUE="I">
```
Note: multiple key strings and adaptive keys may be used to identify the letter, expression, word, phrase, pattern, format, etc.

Postscript

```
</APPLET>
</BODY>
</HTML>
```

With continuing reference to FIG. 11, a message object is then created in operation 1110. Thereafter, the string and appendages, or message data, is attached to the object in operation 1112 using the JAVA mail API. Using the information collected about the server, a connection is then effected with the desired host mail server (SMTP or the like) in operation 1114 after which the message object and data are sent in operation 1116. In the case of multiple electronic mail destinations, this operation may be repeated as many times as required. An error status is then retrieved in operation 1118 to enable the decision 908 of FIG. 9. Next, the server is disconnected in operation 1120 and the error status is returned in operation 1122. It should be noted that submission of the data may be accomplished in any form submit-type process.

One example of functionality that may be implemented by the first application program was shown in FIG. 6. It should be noted, however, that any type of functionality may be employed by running a code segment including as a parameter at least a portion of the text included with the electronic message.

In various embodiments, the functionality may include the incorporation of an image, video, a specific graphic feature, or any other type of object for that matter. For example, any type of theme such as rabbits, earthquakes, time, popular icons and trademarks may be employed during the display of the text associated with the electronic message. As an option, such graphics may in some way interact with the text of the electronic message.

For example, where the theme is earthquakes, the text may be shown to shutter or the like. Or, where the theme is rabbits, the rabbits may be shown hopping from word to word. Still yet another example includes dressing or undressing an icon in various attire or providing any other type of feedback based on user input. Further, where the theme is time, a format of a time, i.e. "7:00", may be detected in order to replace the same with an analog clock graphic which corresponds with the detected time.

As an option, the selection of the graphic or icon may initiate a link to a predetermine site on the network. Still yet, the application program may be adapted to allow the object to be substituted with any of the strings of the text while it is being shown. This may be accomplished with a select and "drag" feature.

In another embodiment, the execution of the first application program may include linking a string of the text of the first electronic message with a site on the network. In other words, such string constitutes a hyperlink. In such embodiment, the execution of the first application program may further include automatically inputting the string as a parameter to the site on the network upon selection of the hyperlink for various purposes. In the case where the site is a search engine, the string may be automatically entered as a search term in the search engine upon the selection of the hyperlink, thus prompting immediate reaction by the search engine. One example of an implementation of this concept is as follows:

http://www.search_engine.com/?MT=keystring&SM=MC&DV=0&LG=any&DC=10&DE=2&_v=2&OPs=MDRTP In still another embodiment, the functionality associated with the electronic messages provides an inducement for sending them to additional users. With this exposure, the present invention may be used to propagate advertisements over the network. First, the electronic message is provided with the application program attached thereto which is capable of displaying an advertisement. As the message is communicated over the network, each instance of such communication is detected.

As such, the number of the instances that the electronic message is communicated over the network may be traced. The advertisement is then displayed after a predetermined number of the instances greater than one has been tracked. By employing this technique, the users will not be thwarted from forwarding the electronic message until after a predetermined geometric propagation has already taken place. It should be noted that the foregoing tracking ability may also be used to base a determination of compensation from the advertiser.

As an option, the predetermined number may be based on a Fibonacci sequence for optimized perpetuance of the electronic message. Further, the predetermined number may be based on a generation of the electronic message. As an option, the advertisement may be displayed by automatically linking to a site on the network.

Figure 12:
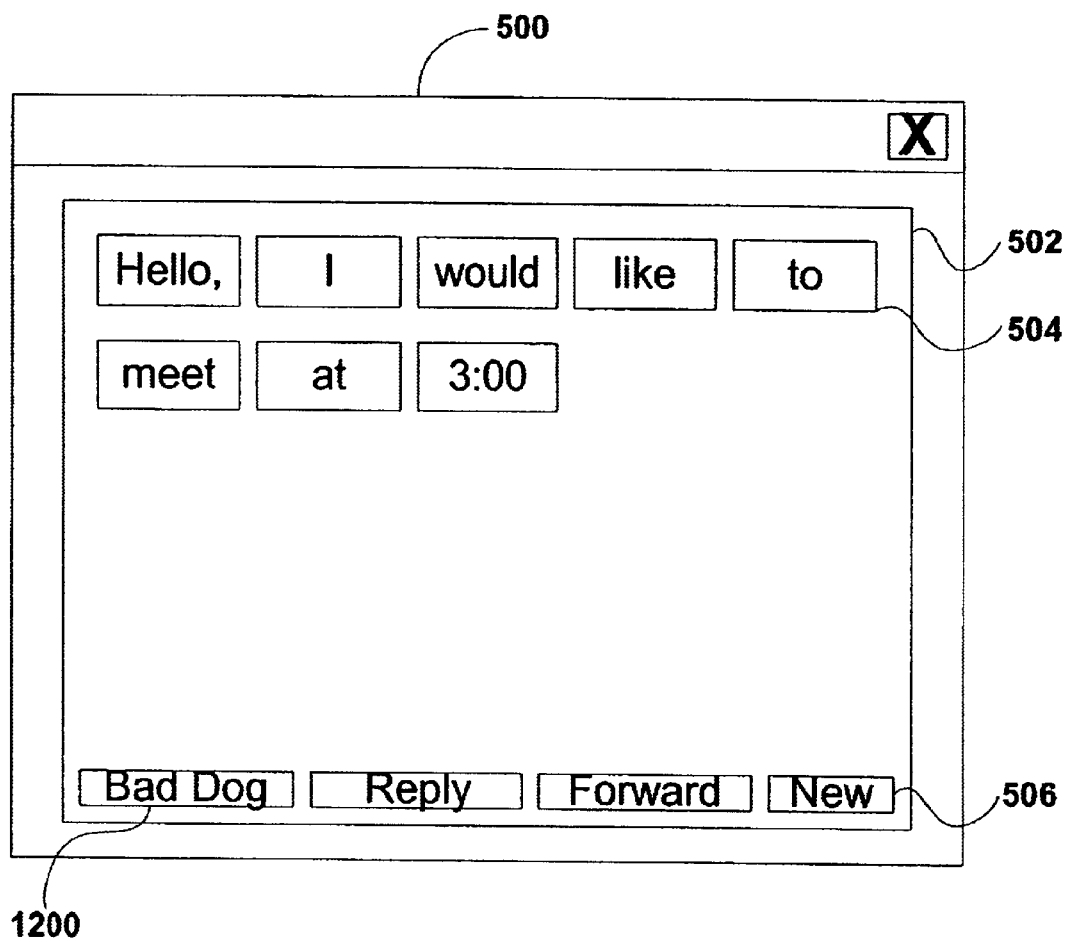
FIG. 12 is a graphical user interface similar to that of FIG. 5 with the exception of an additional "unwanted electronic message" icon.

FIG. 12 is a graphical user interface similar to that of FIG. 5 with the exception of an additional "unwanted electronic message" icon 1200, or indicia, that is displayed upon execution of the first application program. Upon selection of such indicia, a server-based process is initiated to help preclude unwanted electronic messages, or "spam", from being sent on a network.

To facilitate this, each message that is received by the user is assigned a unique identifier by the server by way of a common gateway interface (CGI) or the like. In one embodiment, such identifier may include a domain name. In yet another embodiment, the identifier may be a number that is randomly generated, but large enough to ensure uniqueness. This number may be stored in the first application as a parameter, or incorporated into the HTML associated with generating the "unwanted electronic message" icon 1200.

Upon selection of the "unwanted electronic message" icon 1200, the identifier of the electronic message is communicated on the network to a designated server. For reasons that will soon become apparent, content of the electronic message may optionally also be sent.

Figure 13:
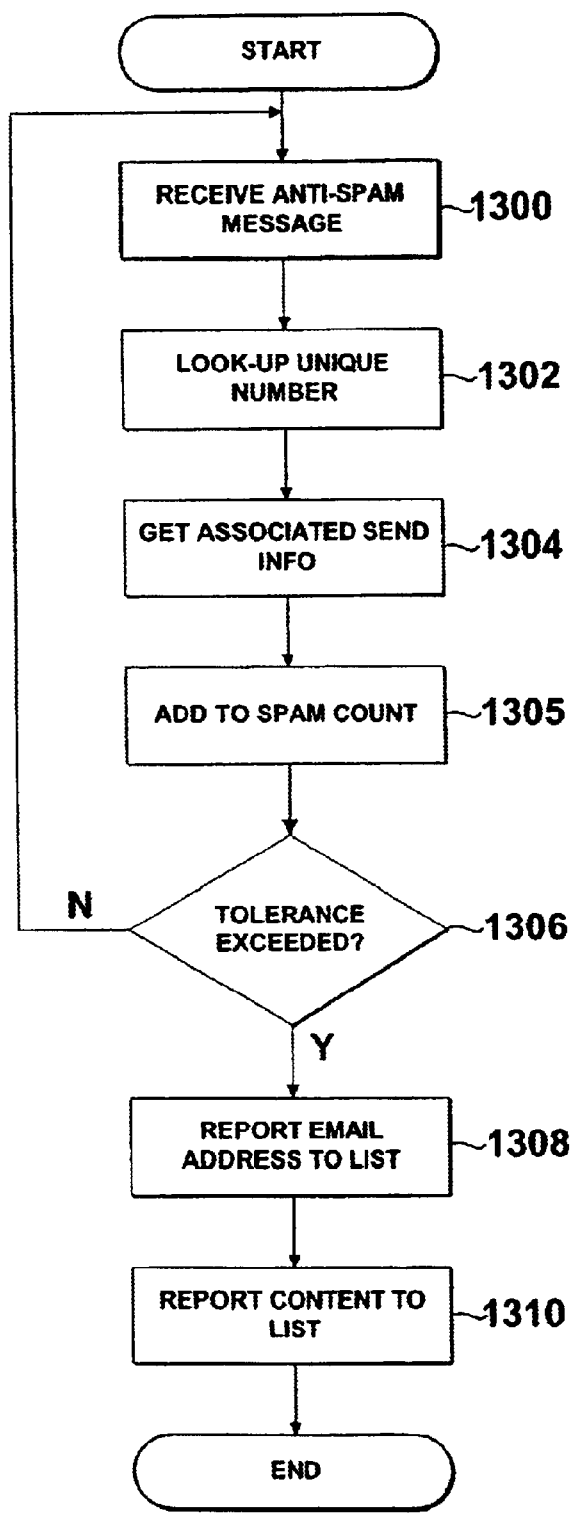
FIG. 13 is a flowchart illustrating a server-based process initiated upon the selection of the additional "unwanted electronic message" icon of FIG. 12.

FIG. 13 is a flowchart illustrating a server-based process initiated upon the selection of the additional "unwanted electronic message" icon of FIG. 12 and the receipt of the identifier and content by the server. As shown, the identifier and content of the unwanted message are received in operation 1300. Thereafter, the unique number is looked-up in operation 1302 in order to retrieve associated information on the source of the unwanted electronic message in operation 1304. In the case where the identifier is a number, such number may be used to ascertain the domain name of the message which may be stored with the identifier at the time of transmission. A counter associated with the domain name or the electronic message itself is then incremented in operation 1305.

Thereafter, in decision 1306, a number of identifiers identifying the same unwanted message or messages from the same source(domain name) is tracked for the purpose of determining whether a tolerance has been exceeded. In other words, it is determined whether such occurrences have exceeded a predetermined level. If not, the identifiers are continuously tracked.

If, however, the tolerance has been exceeded, the unwanted electronic message is reported in operation 1308 for preventing proliferation of the electronic message, similar messages, and/or messages from a similar source. In addition to reporting the message, the server itself may even take active measures to filter or eliminate the electronic message, similar messages, and/or messages from a similar source.

As an option, the content of the electronic message may also be reported in operation 1310 to the list, thus allowing the prevention of transmission of any subsequent electronic messages having content substantially similar to the received content. It should be noted that "lists" are commonly known as a means of preventing the proliferation of already identified unwanted electronic messages. Still yet another option may include sending the user a notice that the report has been received.

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present include all such alternatives, modifications, permutations, and equivalents.

What is claimed is:

1. A method for communicating via an application program associated with an electronic message, comprising:

receiving over a network at least in part one application program identified by a URL embedded in an electronic message previously received over said network after said electronic message is selected by a user for viewing; and executing the application program after the receipt thereof, the execution of the application program including:
  displaying text included with the electronic message, and
  running a code segment including as a parameter at least a portion of the text included with the electronic message.

2. The method as set forth in claim 1, wherein the application program is executed on a network browser.

3. The method as set forth in claim 1, wherein the electronic message is selected on an electronic mail browser.

4. The method as set forth in claim 1, wherein the execution of the application program further includes displaying indicia, allowing entry of text, and sending the entered text and the application program over the network in a second electronic message to a second user upon selection of the indicia.

5. The method as set forth in claim 1, wherein the code segment replaces a selected string of the text of the electronic message with a graphic.

6. The method as set forth in claim 5, wherein selection of the graphic initiates a link to a site on the network.

7. The method as set forth in claim 1, wherein the code segment links a string of the text of the electronic message with a site on the network.

8. The method as set forth in claim 1, wherein the execution of the application program includes linking a string of the text of the first electronic message with a search engine on a network.

9. The method as set forth in claim 8, wherein the execution of the application program further includes automatically inputting the string as a search term in the search engine upon the linking with the search engine.

10. A computer program embodied on a computer readable medium for communicating via an application program associated with an electronic message, comprising:
  a code segment for receiving over a network at least in part one application program identified by a URL embedded in an electronic message previously received over said network after said electronic message is selected by a user for viewing; and
  a code segment for executing the application program after the receipt thereof, the execution of the application program including:
    displaying text included with the electronic message, and
    running a code element including as a parameter at least a portion of the text included with the electronic message.

11. The computer program as set forth in claim 10, wherein the application program is executed on a network browser.

12. The computer program as set forth in claim 10, wherein the electronic message is selected on an electronic mail browser.

13. The computer program as set forth in claim 10, wherein the execution of the application program further includes displaying indicia, allowing entry of text, and sending the entered text and the application program over the network in a second electronic message to a second user upon selection of the indicia.

14. The computer program as set forth in claim 10, wherein the code element replaces a selected string of the text of the electronic message with a graphic.

15. The computer program as set forth in claim 14, wherein selection of the graphic initiates a link to a site on the network.

16. The computer program as set forth in claim 10, wherein the code element links a string of the text of the electronic message with a site on the network.

17. The computer program as set forth in claim 10, wherein the execution of the application program includes linking a string of the text of the first electronic message with a search engine on a network.

18. The computer program as set forth in claim 17, wherein the execution of the application program further includes automatically inputting the string as a search term in the search engine upon the linking with the search engine.

19. A system for communicating via an application program included in an electronic message, comprising:
  logic for receiving over a network at least in part one application program identified by a URL embedded in an electronic message previously received over said network after an said electronic message is selected by a user for viewing; and
  logic for executing the application program after the receipt thereof, the execution of the application program including:
    displaying text included with the electronic message, and
    running a code segment including as a parameter at least a portion of the text included with the electronic message.

20. A system for communicating via an application program included in an electronic message as set forth in claim 19, wherein the electronic message is selected on an electronic mail browser.

* * * * *